United States Patent
Oh et al.

(10) Patent No.: US 11,322,305 B2
(45) Date of Patent: May 3, 2022

(54) MULTILAYER CAPACITOR

(71) Applicant: SAMSUNG ELECTRO-MECHANICS CO., LTD., Suwon-si (KR)

(72) Inventors: Won Kuen Oh, Suwon-si (KR); Hye Hun Park, Suwon-si (KR); Tae Gyeom Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 85 days.

(21) Appl. No.: 16/778,965

(22) Filed: Jan. 31, 2020

(65) Prior Publication Data

US 2021/0065984 A1    Mar. 4, 2021

(30) Foreign Application Priority Data

Sep. 2, 2019   (KR) .................. 10-2019-0108057

(51) Int. Cl.
*H01G 4/30* (2006.01)
*H01G 4/012* (2006.01)
*H01G 4/12* (2006.01)
*H01G 2/06* (2006.01)

(52) U.S. Cl.
CPC ............... *H01G 4/30* (2013.01); *H01G 2/065* (2013.01); *H01G 4/012* (2013.01); *H01G 4/1209* (2013.01)

(58) Field of Classification Search
CPC ........ H01G 4/1209; H01G 2/065; H01G 4/30; H01G 4/232; H01G 4/228; H01G 4/012; H10G 4/012
USPC ............. 361/301.4, 303, 321.1, 321.3, 306.3
See application file for complete search history.

(56) References Cited

U.S. PATENT DOCUMENTS

| 2015/0068794 A1* | 3/2015 | Kang ................... H01G 4/2325 174/260 |
| 2018/0082786 A1 | 3/2018 | Asano et al. |
| 2018/0082789 A1 | 3/2018 | Asano et al. |

FOREIGN PATENT DOCUMENTS

| JP | 2010-109238 A | 5/2010 |
| JP | 2011-190151 A | 9/2011 |
| JP | 2018-049881 A | 3/2018 |
| JP | 2018-049885 A | 3/2018 |

* cited by examiner

*Primary Examiner* — Arun Ramaswamy
(74) *Attorney, Agent, or Firm* — Morgan, Lewis & Bockius LLP

(57) ABSTRACT

A multilayer capacitor includes a capacitor body having first through six surfaces, and having alternately stacked first internal electrodes and second internal electrodes having dielectric layers therebetween and each having one end thereof exposed through a respective one of third and fourth surfaces. First and second conductive layers respectively include first and second connection portions respectively disposed on the third and fourth surfaces of the capacitor body and respectively connected to the first and second internal electrodes, and first and second band portions respectively extending from the first and second connection portions to respective portions of the first, second, fifth, and sixth surfaces of the capacitor body. First and second reinforcing layers each include a carbon material and an impact-absorbing binder and are respectively disposed on the first and second band portions.

35 Claims, 6 Drawing Sheets

I-I'

MULTILAYER CAPACITOR

CROSS-REFERENCE TO RELATED APPLICATION(S)

This application claims benefit of priority to Korean Patent Application No. 10-2019-0108057 filed on Sep. 2, 2019 in the Korean Intellectual Property Office, the disclosure of which is incorporated herein by reference in its entirety.

BACKGROUND

1. Field

The present disclosure relates to a multilayer capacitor.

2. Description of Related Art

In general, a multilayer capacitor has external electrodes connected to internal electrodes that are disposed in parallel with each other. The external electrodes serve to protect a capacitor body from external physical shock or moisture.

Due to their use in automobiles, multilayer capacitors with special specifications, such as those for high capacitance, are required to have higher reliability in bending strength resulting from events such as thermal shocks or physical shocks, and thus, the development of multilayer capacitors having a new structure with high reliability is needed.

SUMMARY

An aspect of the present disclosure provides a multilayer capacitor having excellent bending strength and capable of improving moisture resistance, chemical resistance, and conductivity.

According to an aspect of the present disclosure, a multilayer capacitor includes a capacitor body having first and second surfaces opposing each other, third and fourth surfaces connected to the first and second surfaces and opposing each other in a length direction, and fifth and sixth surfaces connected to the first and second surfaces, connected to the third and fourth surfaces, and opposing each other, and having alternately stacked first internal electrodes and second internal electrodes having dielectric layers interposed therebetween and each having one end thereof exposed through a respective one of the third and fourth surfaces. First and second conductive layers respectively include first and second connection portions respectively disposed on the third and fourth surfaces of the capacitor body and respectively connected to the first and second internal electrodes, and first and second band portions respectively extending from the first and second connection portions to respective portions of the first, second, fifth, and sixth surfaces of the capacitor body. First and second reinforcing layers each include a carbon material and an impact-absorbing binder and are respectively disposed on the first and second band portions.

In an embodiment of the present disclosure, first and second conductive resin layers respectively disposed on the first and second conductive layers may be further included, the first reinforcing layer may be disposed between the first conductive layer and the first conductive resin layer, and the second reinforcing layer may be disposed between the second conductive layer and the second conductive resin layer.

In an embodiment of the present disclosure, a length of the first and second reinforcing layers in the length direction may be longer than a length of the first and second band portions in the length direction.

In an embodiment of the present disclosure, the first and second reinforcing layers may be further respectively disposed on the first and second connection portions.

In an embodiment of the present disclosure, first and second plating layers may be disposed on the first and second conductive layers, respectively, Where the first reinforcing layer may be disposed between the first conductive layer and the first plating layer, and the second reinforcing layer may be disposed between the second conductive layer and the second plating layer.

In an embodiment of the present disclosure, the first and second conductive layers may include first and second nickel (Ni) plating layers disposed on the first and second conductive layers, respectively, and first and second tin (Sn) plating layers disposed on the first and second nickel plating layers, respectively.

In an embodiment of the present disclosure, the carbon material of the first and second reinforcing layers may include one or more of graphene, carbon nanotubes, and carbon black.

In an embodiment of the present disclosure, the impact-absorbing binder of the first and second reinforcing layers may include an epoxy-based or an acrylic-based binder.

In accordance with another aspect of the present disclosure, a multilayer capacitor includes a capacitor body including first internal electrodes and second internal electrodes that are alternately stacked with dielectric layers interposed therebetween, and first and second external electrodes disposed on external surfaces of the capacitor body and respectively connected to the first internal electrodes and the second internal electrodes. Each of the first and second external electrodes has a multi-layer structure including multiple electrically-conductive layers stacked on the external surfaces of the capacitor body, and including a reinforcing layer including a carbon material and disposed between two of the multiple electrically-conductive layers.

In accordance with a further aspect of the present disclosure, a multilayer capacitor includes a capacitor body including first internal electrodes and second internal electrodes that are alternately stacked with dielectric layers interposed therebetween, and first and second external electrodes disposed on external surfaces of the capacitor body and respectively connected to the first internal electrodes and the second internal electrodes. First and second reinforcing layers are disposed on different respective portions of the external surfaces of the capacitor body to be spaced apart from each other, and each include a carbon material and an impact-absorbing binder.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
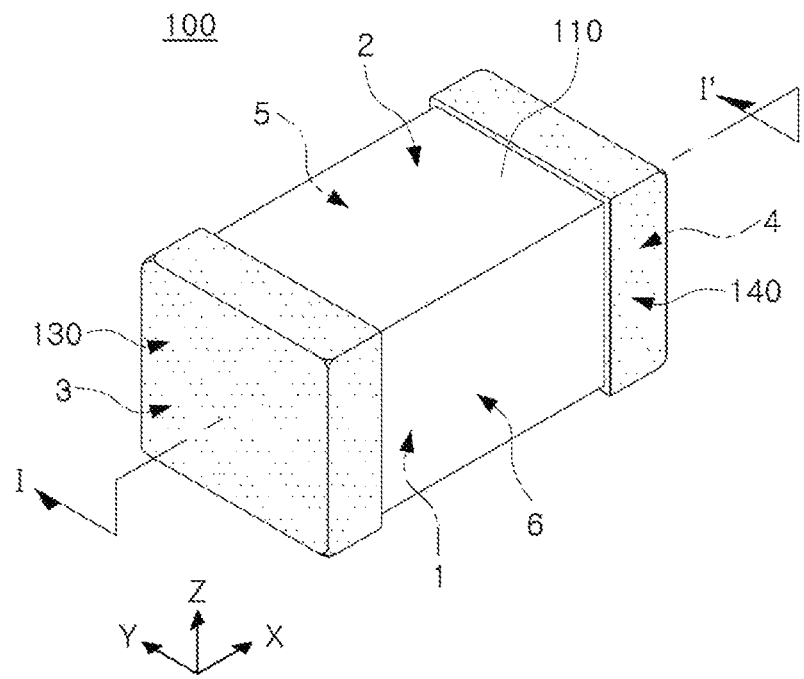
FIG. 1 is schematic perspective view of a multilayer capacitor according to an embodiment of the present disclosure.

Hereinafter, embodiments of the present disclosure will be described in detail with reference to the accompanying drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity.

Further, in the drawings, elements having the same functions within the same scope of the inventive concept will be designated by the same reference numerals.

Throughout the specification, when a component is referred to as "comprise" or "comprising," it means that it may include other components as well, without necessarily excluding other components unless specifically stated otherwise.

Hereinafter, when a direction of a capacitor body 110 is defined to clearly explain an embodiment in the present disclosure, X, Y, and Z shown in figures represent a length direction, a width direction, and a thickness direction of the capacitor body 110, respectively. Further, in the present embodiment, the Z direction may be conceptually the same as a lamination direction in which dielectric layers are stacked and laminated.

Figure 2A:
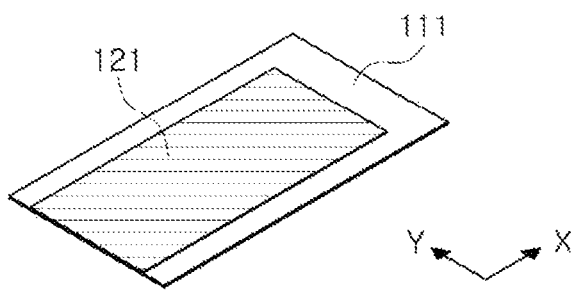
FIGS. 2A to 2B are plan views illustrating first and second internal electrodes of the multilayer capacitor of FIG. 1, respectively.
Figure 2B:
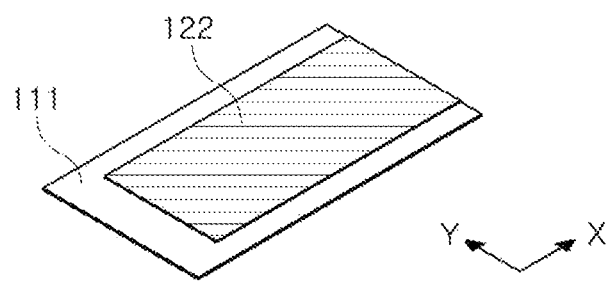
Figure 3:
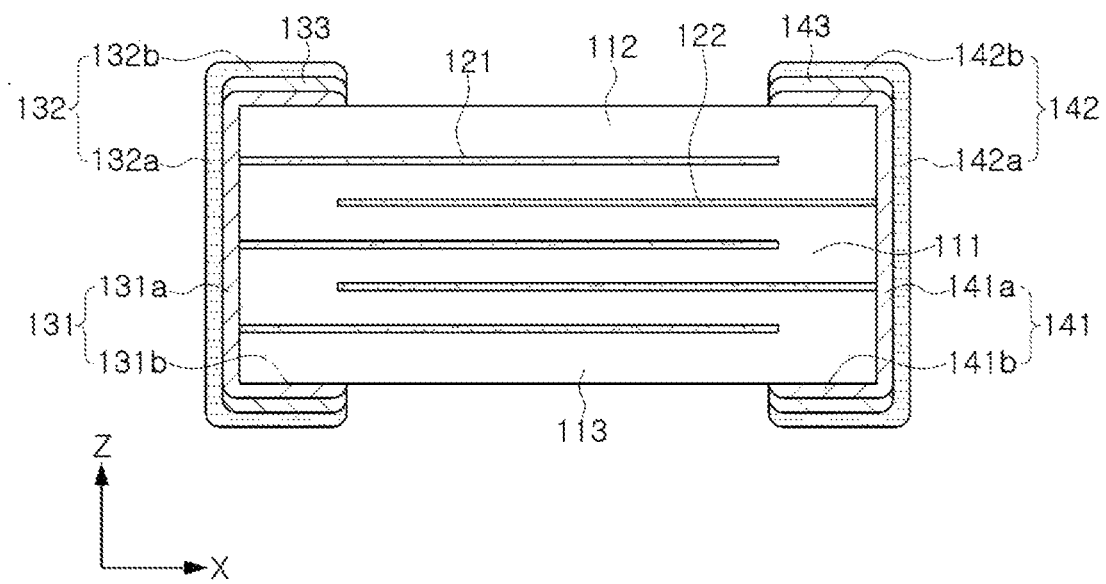
FIG. 3 is a cross-sectional view taken along line I-I' of FIG. 1.

FIG. 1 is a schematic perspective view of a multilayer capacitor according to an embodiment of the present disclosure, FIGS. 2A to 2B are plan views illustrating first and second internal electrodes of the multilayer capacitor of FIG. 1, respectively, and FIG. 3 is a cross-sectional view taken along line I-I' of FIG. 1.

Referring to FIGS. 1, 2A, 2B, and 3, a multilayer capacitor 100 according to the present embodiment includes a capacitor body 110 and first and second external electrodes 130 and 140 and first and second reinforcing layers 133 and 143.

The capacitor body 110 is formed by laminating a plurality of dielectric layers 111 in the Z direction and then sintering the plurality of dielectric layers 111, and boundaries between adjacent dielectric layers 111 of the capacitor body 110 may be integrated, such that they may be difficult to confirm without using a scanning electron microscope (SEM).

In this case, the capacitor body 110 may have a generally hexahedral shape, but the present disclosure is not limited thereto. In addition, the shape and dimensions of the capacitor body 110 and the number of laminated layers of the dielectric layer 111 are not limited to those illustrated in the drawings of the present embodiment.

In the present embodiment, for convenience of explanation, both surfaces of the capacitor body 110 opposing each other in the Z direction are defined as first and second surfaces 1 and 2, both surfaces connected to the first and second surfaces 1 and 2 and opposing each other in the X direction are defined as third and fourth surfaces 3 and 4, and both surfaces connected to the first and second surfaces 1 and 2, connected to the third and fourth surfaces 3 and 4 and opposing each other in the Y direction are defined as fifth and sixth surfaces 5 and 6. In addition, in the present embodiment, a mounting surface of the multilayer capacitor 100 may be the first surface 1 of the capacitor body 110.

Each dielectric layer 111 may include a ceramic material having a high dielectric constant, for example, a barium titanate ($BaTiO_3$)-based ceramic powder, a strontium titanate ($SrTiO_3$)-based ceramic powder, or the like. However, the present disclosure is not limited thereto as long as sufficient capacitance may be obtained therewith.

In addition, a ceramic additive, an organic solvent, a plasticizer, a binding agent, a dispersant, and the like, may further be added to the dielectric layer 111, together with the ceramic powder.

As the ceramic additive, for example, a transition metal oxide or a transition metal carbide, a rare earth element, magnesium (Mg), aluminum (Al), or the like, may be used.

The capacitor body 110 may include an active region serving as a part contributing to capacitance formation of the capacitor and upper and lower covers 112 and 113 respectively formed above and below the active region as the upper and lower margin portions. For example, the upper and lower covers 112 and 113 may respectively be formed above an uppermost internal electrode and below a lowermost internal electrode among the first and second internal electrodes 121 and 122 in the capacitor body 110.

The upper and lower covers 112 and 113 may have the same material and configuration as the dielectric layers 111 except for not including internal electrodes.

The upper and lower cover 112 and 113 may be formed by laminating a single dielectric layer or two or more dielectric layers on the upper and lower surfaces of the active region in the Z direction, respectively, and may prevent damage to the first and second internal electrodes 121 and 122 due to physical or chemical stress.

The first and second internal electrodes 121 and 122 are alternately disposed in the Z direction with the dielectric layers 111 interposed therebetween, and each serve as an electrode to which different polarities are applied. One end of each of the first and second internal electrodes 121 and 122 may be exposed through the third and fourth surfaces 3 and 4 of the capacitor body 110, respectively.

In this case, the first and second internal electrodes 121 and 122 may be electrically insulated from each other by the dielectric layers 111 disposed in the middle.

End portions of the first and second internal electrodes 121 and 122 respectively exposed through the third and fourth surfaces of the capacitor body 110 may be respectively connected to first and second external electrodes 130 and 140 respectively disposed on the third and fourth surfaces 3 and 4 of the capacitor body 110 described below, so as to be electrically connected.

According to the above configuration, when a predetermined voltage is applied to the first and second external electrodes 130 and 140, charges are accumulated between the first and second internal electrodes 121 and 122.

In this case, capacitance of the multilayer capacitor 100 is proportional to an area of overlap of the first and second internal electrodes 121 and 122 superimposed on each other in the Z direction in the active region.

In addition, a material for forming the first and second internal electrodes 121 and 122 is not particularly limited, and the internal electrodes may be formed by using for example, a noble metal material such as platinum (Pt), palladium (Pd), an alloy of palladium-silver (Pd—Ag), and the like, and a conductive paste made of one or more materials of nickel (Ni) and copper (Cu).

In this case, the conductive paste may be printed by a screen-printing method, a gravure printing method, or the like but the present disclosure is not limited thereto.

The first and second external electrodes 130 and 140 are provided with voltages having different polarities, may be disposed on opposing end portions of the capacitor body 110 opposing each other in the X direction, and may respectively be connected to the exposed portions of the first and second internal electrodes 121 and 122 to be electrically connected thereto.

In this case, the first and second external electrodes 130 and 140 are each formed on a respective surface of the capacitor body 110 and include first and second conductive layers 131 and 141 contacting and connected to the first and second internal electrodes 121 and 122.

The first conductive layer 131 may include a first connection portion 131a and a first band portion 131b.

The first connection portion 131a is a portion disposed on the third surface 3 of the capacitor body 110 and contacting and connected to the exposed portion of the first internal electrode (s) 121, and the first band portion 131b is a portion extending from the first connection portion 131a to portions of the first, second, fifth, and sixth surfaces 1, 2, 5, and 6 of the capacitor body 110.

The second conductive layer 141 may include a second connection portion 141a and a second band portion 141b.

The second connection portion 141a is a portion disposed on the fourth surface 4 of the capacitor body 110 and contacting and connected to the exposed portion of the second internal electrode (s) 122, and the second band portion 141b is a portion extending from the second connection portion 141a to portions of the first, second, fifth, and sixth surfaces 1, 2, 5, and 6 of the capacitor body 110.

The first and second conductive layers 131 and 141 may include at least one of copper (Cu) and silver (Ag), and may further include glass, epoxy, and the like.

The first reinforcing layer 133 is disposed on the first band portion 131b, and includes a carbon material and an impact-absorbing binder.

The second reinforcing layer 143 is disposed on the second band portion 141b, and includes a carbon material and an impact-absorbing binder.

In this case, the carbon material may include one or more of graphene, carbon nanotubes, and carbon black.

In addition, the impact-absorbing binder may include an epoxy-based or an acrylic-based binder.

In addition, the first and second reinforcing layers 133 and 143 may further include metal powder.

In this case, the metal powder may be one or more of Cu, Ag, Au, Ni, and Sn.

As such, when the first and second reinforcing layers include metal powder, bending strength and conductivity of the external electrodes may be further improved, similarly to in the embodiments in which the external electrodes to be described later include the conductive resin layers.

In addition, a multilayer capacitor 100 of the present embodiment may further include first and second plating layers 132 and 142 respectively disposed on the first and second conductive layers 131 and 141 of the first and second external electrodes 130 and 140.

In this case, the first and second plating layers 132 and 142 may include respective first and second nickel (Ni) plating layers disposed on the first and second conductive layers 131 and 141, and respective first and second tin (Sn) plating layers disposed on the first and second nickel plating layers.

In addition, the first and second plating layers 132 and 142 may include first and second plating layer connection portions 132a and 142a in contact with the first and second connection portions 131a and 141a, respectively, and first and second plating layer band portions 132b and 142b in contact with the first and second band portions 131b and 141b, respectively.

In the multilayer capacitor, a bending impact may be easily transmitted from a substrate, and a position at which a main stress caused by the bending impact acts is a starting surface of the band portion of the external electrode.

In the related art, a non-conductive material is formed to be longer than the plating layer in a portion in which the band portion starts, so as to disperse the stress at the starting surface of the band portion of the external electrode.

However, in a structure in the related art, the non-conductive material formed on the capacitor body volatilizes or flows during a reflow temperature period during firing, and thus a shape of a non-conductive portion formed of the non-conductive material may not be properly maintained, thereby causing a problem in that an impact-adsorbing effect, as well as moisture resistance, chemical resistance, and conductivity are lowered.

According to the present embodiment, the first and second reinforcing layers 133 and 143 include a carbon material and an impact-absorbing binder to disperse stress at a starting surface of the band portion of the external electrode, but prevent volatilization or flow in a reflow temperature period, and the shape thereof may be properly maintained. Thus, bending strength, moisture resistance, chemical resistance, and conductivity of the multilayer capacitor may be improved.

Figure 4:
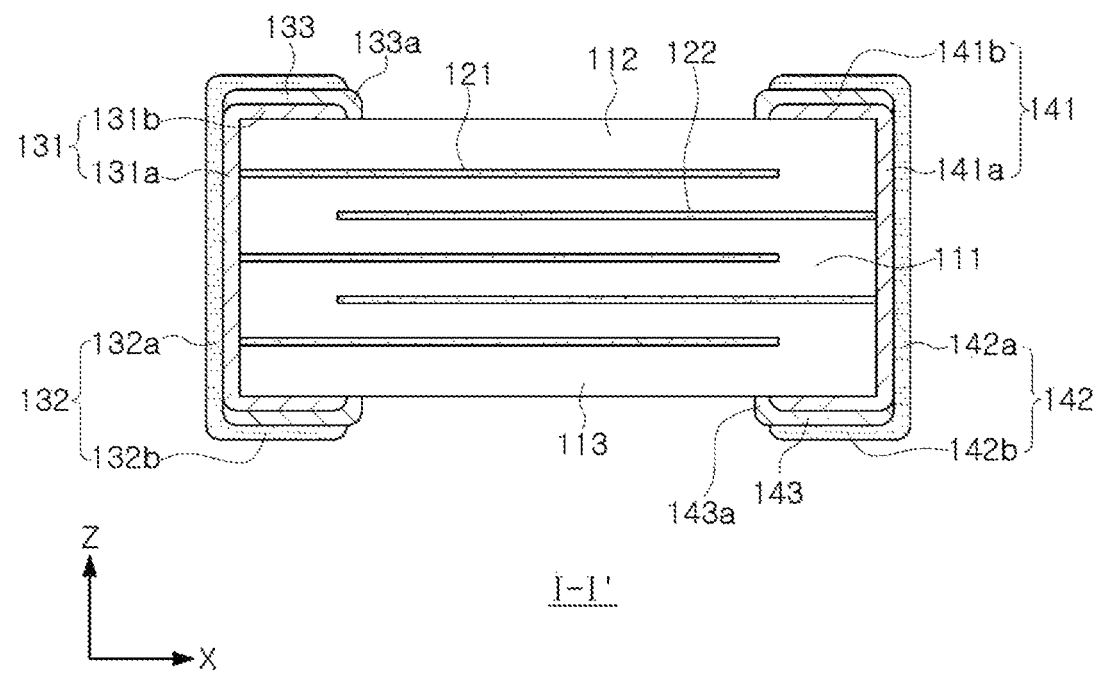
FIG. 4 is a cross-sectional view illustrating another embodiment of a reinforcing layer.

In addition, as shown in FIG. 4, the first and second reinforcing layers 133 and 143 may be provided with extension portions 133a and 143a at an end portion thereof, respectively, such that lengths in the X direction are formed longer than lengths of the first and second band portions 131b and 141b in the X direction, respectively.

Accordingly, the extension portions 133a and 143a of the first and second reinforcing layers 133 and 143 may protrude longer than end portions of the first and second band portions 131b and 141b and cover the end portions of the first and second band portions 131b and 141b, which are vulnerable to reliability. For example, the extension portions 133a and 143a may extend over ends of the first and second band portions 131b and 141b to thereby come into direct contact with and extend onto portions of the first, second, fifth, and sixth surfaces 1, 2, 5, and 6 of the body 110.

Therefore, characteristics of excellent moisture resistance, chemical resistance, and conductivity, which are basic properties of the carbon material, may improve bending strength, moisture resistance, and chemical resistance of the multilayer capacitor, and conductivity of the external electrodes may be also improved.

Figure 5:
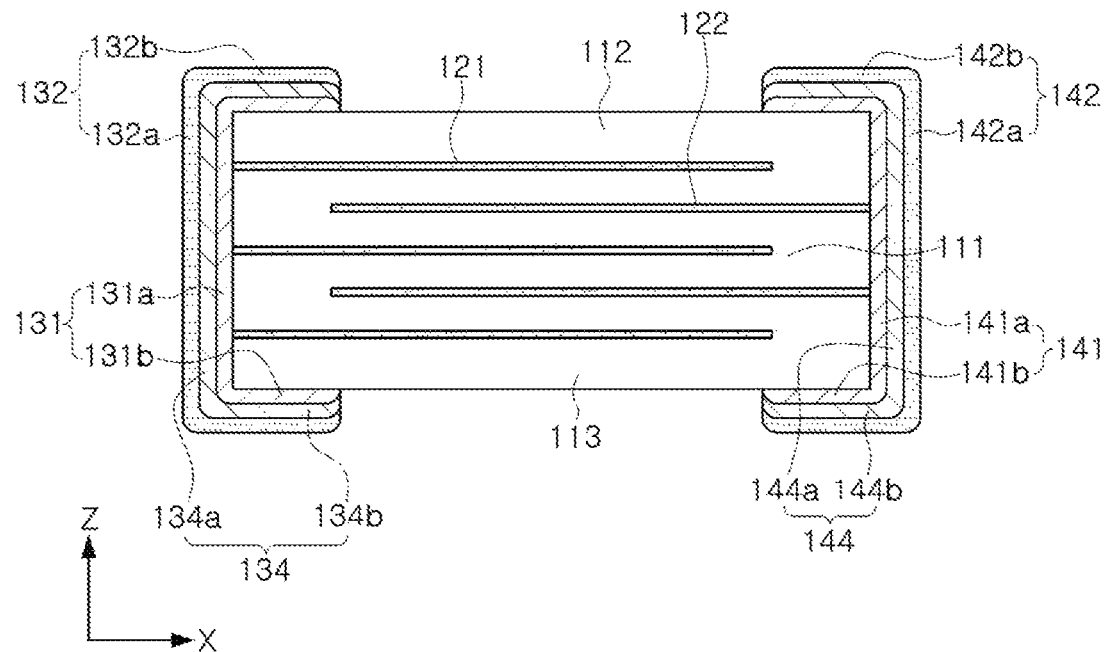
FIG. 5 is a cross-sectional view illustrating another embodiment of a reinforcing layer.

In addition, as shown in FIG. 5, the first and second reinforcing layers 134 and 144 may be further respectively disposed on the first connection portion 131a of the first conductive layer 131 and the second connection portion 141a of the second conductive layer 141.

In the first reinforcing layer 134, a portion 134a disposed in the first connection portion 131a and a portion 134b disposed in the first band portion 131b may be connected to each other, and in the second reinforcing layer 144, a portion 144a disposed in the second connection portion 141a and a portion 144b disposed in the second band portion 141b may be connected to each other.

Figure 6:
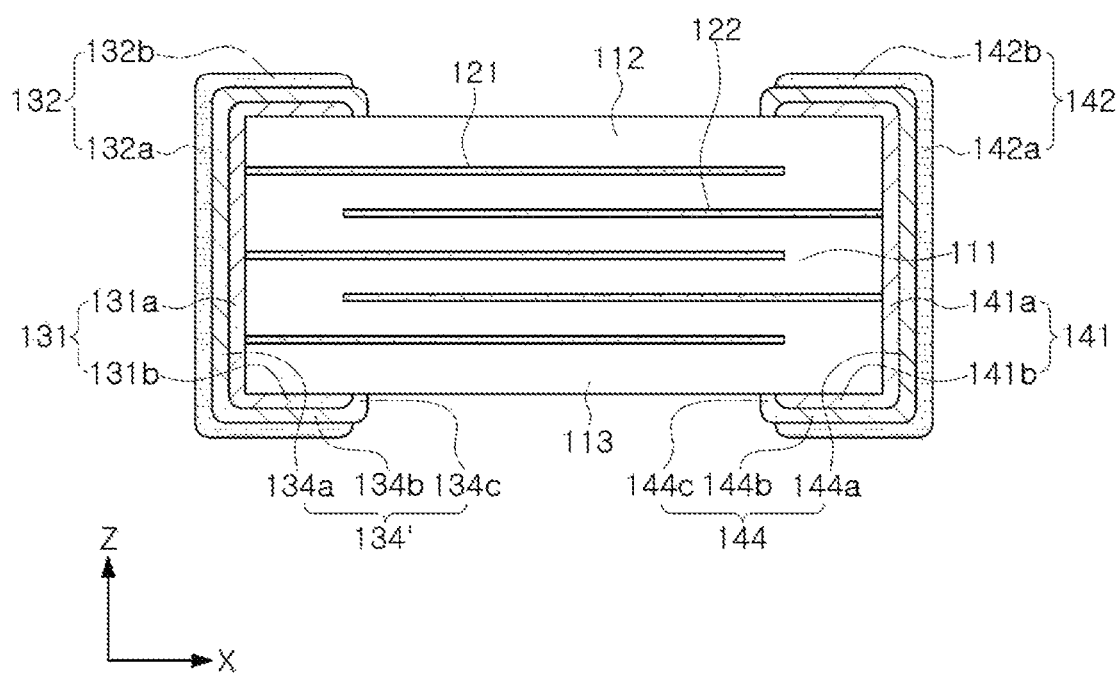
FIG. 6 is a cross-sectional view illustrating another embodiment of a reinforcing layer.

Optionally in this case, as shown in FIG. 6, first and second reinforcing layers 134' and 144' may be provided with extension portions 134c and 144c, respectively, at an end portion such that lengths thereof in the X direction are formed to be longer than lengths of the first and second band portions 131b and 141b in the X direction, respectively.

Figure 7:
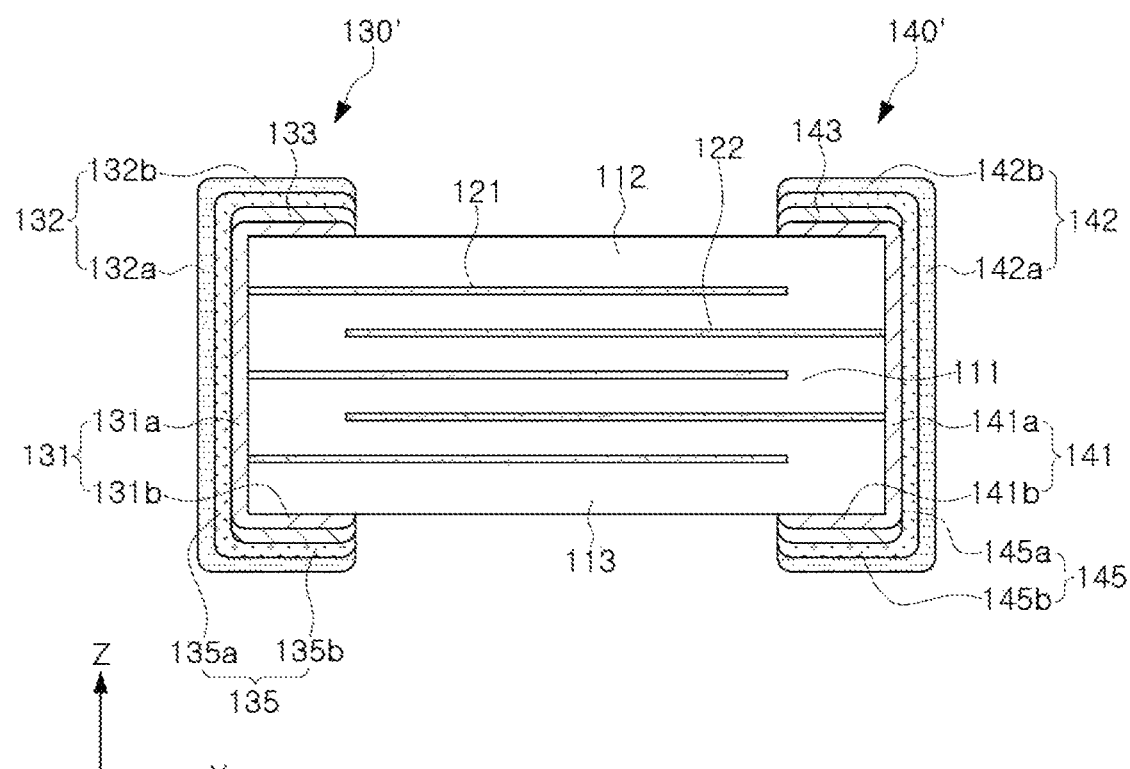
FIG. 7 is a cross-sectional view illustrating another embodiment of the multilayer capacitor of the present disclosure, and illustrating that a conductive resin layer is included in external electrodes.

In addition, according to another embodiment of the present disclosure, as shown in FIG. 7, first and second external electrodes 130' and 140' may further include first and second conductive resin layers 135 and 145 disposed on the first and second conductive layers 131 and 141, respectively.

In addition, the first and second conductive resin layers 135 and 145 may include first and second resin layer connection portions 135a and 145a in contact with the first and second connection portions 131a and 141a, respectively, and first and second resin layer band portions 135b and 145b overlapping or in contact with the first and second band portions 131b and 141b, respectively. Alternatively, as shown in FIG. 7, the first and second resin layer band portions 135b and 145b may be in contact with the first and second reinforcing layers 133 and 143, respectively.

The first and second conductive resin layers 135 and 145 may include a conductive resin and a plurality of metal particles dispersed in the conductive resin.

In this case, the conductive resin may include an epoxy-based or an acrylic-based binder.

In addition, the metal particles may include one or more of Cu, Ag, and Sn.

The first and second conductive resin layers 135 and 145 may serve to increase bending strength of the multilayer capacitor by absorbing external impacts after mounting on the substrate.

According to a structure of FIG. 7, since elasticity of the external electrodes 130' and 140' including the conductive resin layer is improved, durability against the bending strength may be further increased, and the conductivity may be maintained at an appropriate level. As in the case in which there is no conductive resin layer, the bending strength, moisture resistance, and chemical resistance of the multilayer capacitor may be improved by the reinforcing layer.

The first reinforcing layer 133 may be disposed between the first band portion 131b of the first conductive layer 131 and the first resin layer band portion 135b of the first conductive resin layer 135, and the second reinforcing layer 143 may be disposed between the second band portion 141b of the second conductive layer 141 and the second resin layer band portion 145b of the second conductive resin layer 145.

Figure 8:
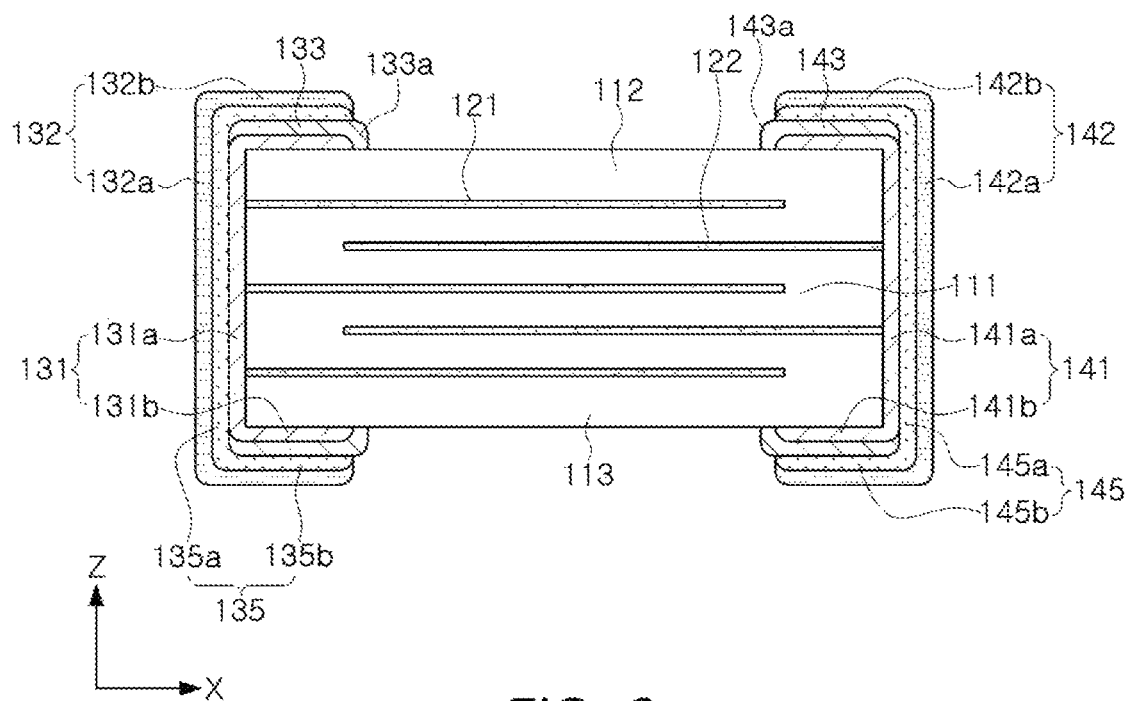
FIG. 8 is a cross-sectional view illustrating another embodiment of a reinforcing layer.

In addition, as shown in FIG. 8, the first and second reinforcing layers 133 and 143 may be provided with the extension portions 133a and 143a at an end portion thereof, respectively, such that lengths thereof in the X direction are formed longer than lengths of the first and second band portions 131b and 141b in the X direction, respectively.

Figure 9:
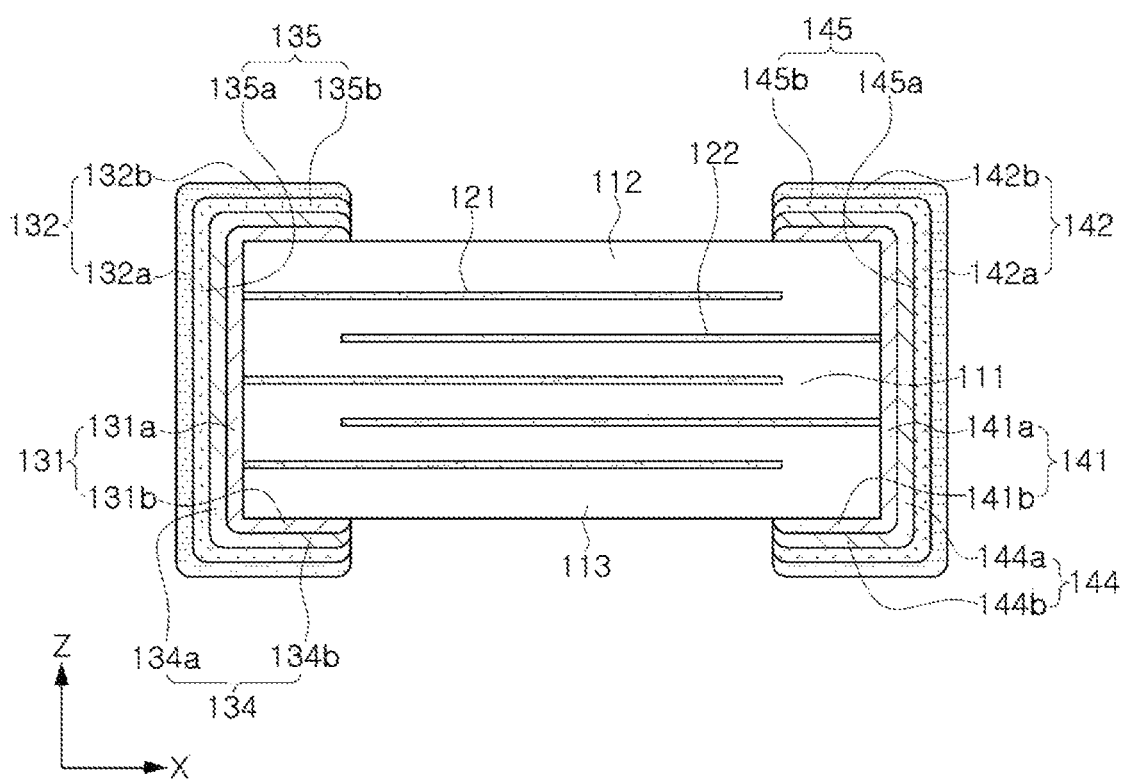
FIG. 9 is a cross-sectional view illustrating another embodiment of a reinforcing layer.

In addition, as shown in FIG. 9, the first and second reinforcing layers 134 and 144 may be further disposed on the first connection portion 131a of the first conductive layer 141 and the second connection portion 141a of the second conductive layer 141, respectively.

Accordingly, the first reinforcing layer 134 may be disposed between the first connection portion 131a of the first conductive layer 131 and the first resin layer connection portion 135a of the first conductive resin layer 135, and the second reinforcing layer 144 may be disposed between the second connection portion 141a of the second conductive layer 141 and the second resin layer connection portion 145a of the second conductive resin layer 145.

In the first reinforcing layer 134, a portion 134a disposed in the first connection portion 131a and a portion 134b disposed in the first band portion 131b may be connected to each other, and in the second reinforcing layer 144, a portion 144a disposed in the second connection portion 141a and a portion 144b disposed in the second band portion 141b may be connected to each other.

Figure 10:
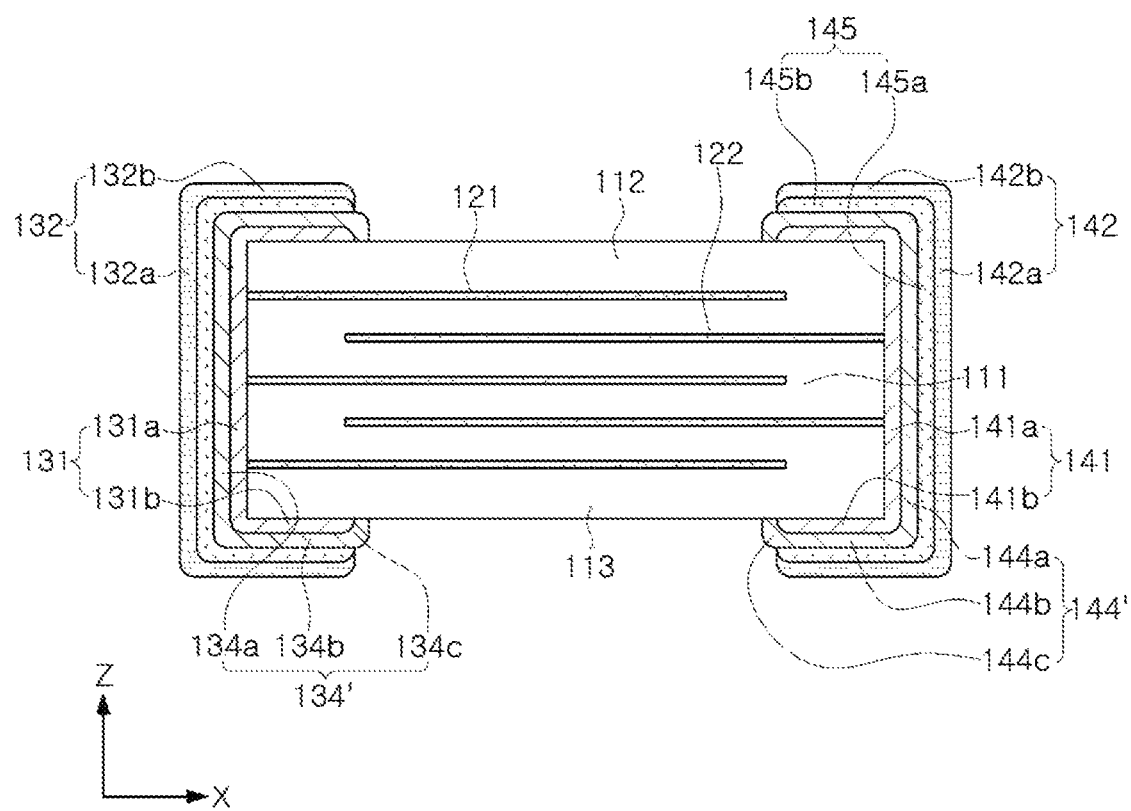
FIG. 10 is a cross-sectional view illustrating another embodiment of a reinforcing layer.

In this case, as shown in FIG. 10, the first and second reinforcing layers 134' and 144' may be provided with extension portions 134c and 144c at an end portion, respectively, such that lengths thereof in the X direction are formed to be longer than lengths of the first and second band portions 131b and 141b in the X direction, respectively.

Table 1 below shows that bending deformation test results according to the structure of the embodiment of the present disclosure.

Here, a Comparison Example exhibits a structure in which there is no reinforcing layer, Example 1 shows a multilayer capacitor having the structure of FIG. 8, Example 2 shows a multilayer capacitor having the structure of FIG. 10, and Example 3 shows a multilayer capacitor having the structure of FIG. 6.

In this case, the number of multilayer capacitors used for each sample is 100, and the multilayer capacitor is manufactured such that the length in the X direction is 3.2 mm, the length in the Y direction is 2.5 mm, and the length in the Z direction is 2.5 mm.

The multilayer capacitor is mounted on a PCB, and the substrate is bent by about 6 mm to observe whether cracks occur in the multilayer capacitor, which is shown in Table 1.

An ESR test is evaluated at a temperature of −55 to 150° C., and with a change rate before and after 1,000 cycles.

TABLE 1

|  | Comparison Example | Example 1 | Example 2 | Example 3 |
|---|---|---|---|---|
| Bending strength NG(EA) | 10/100 | 0/100 | 0/100 | 0/100 |
| ESR change rate (%) | 20% | 5% | 5% | 5% |

Referring to Table 1, according to the present disclosure, in the case of Examples 1 to 3, due to an action of the reinforcing layer, it can be seen that no defects occur in a bending strength test whereas cracks occurred in 10 out of 100 samples of the comparison example, and the ESR change rate is further lowered by 15% or more, thereby greatly improving reliability of the multilayer capacitor.

As set forth above, according to an embodiment of the present disclosure, bending strength, moisture resistance, chemical resistance, and conductivity of the multilayer capacitor may be improved by the reinforcing layer.

While exemplary embodiments have been shown and described above, it will be apparent to those skilled in the art that modifications and variations could be made without departing from the scope of the present invention, as defined by the appended claims.

What is claimed is:

1. A multilayer capacitor comprising:
a capacitor body including first and second surfaces opposing each other, third and fourth surfaces connected to the first and second surfaces and opposing each other in a length direction, and fifth and sixth surfaces connected to the first and second surfaces, connected to the third and fourth surfaces, and opposing each other, and including alternately stacked first internal electrodes and second internal electrodes having dielectric layers interposed therebetween and each having one end thereof exposed through a respective one of the third and fourth surfaces;
first and second conductive layers respectively including first and second connection portions respectively disposed on the third and fourth surfaces of the capacitor body and respectively connected to the first and second internal electrodes, and first and second band portions respectively extending from the first and second connection portions to respective portions of the first, second, fifth, and sixth surfaces of the capacitor body;
first and second reinforcing layers each including a carbon material and respectively disposed on the first and second band portions; and
first and second layers respectively disposed on the first and second reinforcing layers such that an interface is defined therebetween,
wherein the first and second layers respectively include first and second conductive resin layers disposed on the first and second conductive layers, respectively.

2. The multilayer capacitor of claim 1, wherein a length of the first and second reinforcing layers in the length direction is longer than a length of the first and second band portions in the length direction.

3. The multilayer capacitor of claim 1, wherein the first and second reinforcing layers are further respectively disposed on the first and second connection portions.

4. The multilayer capacitor of claim 1,
wherein the first reinforcing layer is disposed between the first conductive layer and the first conductive resin layer, and
the second reinforcing layer is disposed between the second conductive layer and the second conductive resin layer.

5. The multilayer capacitor of claim 4, wherein a length of the first and second reinforcing layers in the length direction is longer than a length of the first and second band portions in the length direction.

6. The multilayer capacitor of claim 4, wherein the first and second reinforcing layers are further respectively disposed on the first and second connection portions.

7. The multilayer capacitor of claim 1, wherein the first and second layers respectively further include first and second plating layers disposed on the first and second conductive layers, respectively,
wherein the first reinforcing layer is disposed between the first conductive layer and the first plating layer, and
the second reinforcing layer is disposed between the second conductive layer and the second plating layer.

8. The multilayer capacitor of claim 7, wherein the first and second plating layers comprise first and second nickel (Ni) plating layers disposed on the first and second conductive layers, respectively, and first and second tin (Sn) plating layers disposed on the first and second nickel plating layers, respectively.

9. The multilayer capacitor of claim 1, wherein the carbon material of the first and second reinforcing layers comprises one or more of graphene, carbon nanotubes, or carbon black.

10. The multilayer capacitor of claim 1, wherein the first and second reinforcing layers each includes an impact-absorbing binder comprising an epoxy-based or an acrylic-based binder.

11. The multilayer capacitor of claim 1, wherein each of the first and second reinforcing layers further includes an impact-absorbing binder.

12. The multilayer capacitor of claim 1, wherein the first and second reinforcing layers are not disposed on the third and fourth surfaces of the capacitor body.

13. A multilayer capacitor comprising:
a capacitor body including first internal electrodes and second internal electrodes that are alternately stacked with dielectric layers interposed therebetween; and
first and second external electrodes disposed on external surfaces of the capacitor body and respectively connected to the first internal electrodes and the second internal electrodes,
wherein each of the first and second external electrodes has a multi-layer structure including multiple electrically-conductive layers stacked on the external surfaces of the capacitor body, and including a reinforcing layer including a carbon material and disposed between two of the multiple electrically-conductive layers such that an interface is defined therebetween, and
wherein the reinforcing layer of each of the first and second external electrodes is not disposed on the external surfaces of the capacitor body through which the first and second external electrodes are respectively connected to the first internal electrodes and the second internal electrodes.

14. The multilayer capacitor of claim 13, wherein the reinforcing layer of each of the first and second external electrodes further includes an impact-absorbing binder.

15. The multilayer capacitor of claim 13, wherein the carbon material in the reinforcing layer of each of the first and second external electrodes includes one or more of graphene, carbon nanotubes, or carbon black.

16. The multilayer capacitor of claim 13, wherein the reinforcing layer of each of the first and second external electrodes is spaced apart from surfaces of the capacitor body.

17. The multilayer capacitor of claim 13, wherein the reinforcing layer of each of the first and second external electrodes extends from the respective first or second external electrode onto surfaces of the capacitor body.

18. The multilayer capacitor of claim 13, wherein the reinforcing layer of the first external electrode is spaced apart from the reinforcing layer of the second external electrode.

19. A multilayer capacitor comprising:
a capacitor body including first internal electrodes and second internal electrodes that are alternately stacked with dielectric layers interposed therebetween;
first and second external electrodes disposed on external surfaces of the capacitor body and respectively connected to the first internal electrodes and the second internal electrodes;
first and second reinforcing layers disposed on different respective portions of the external surfaces of the capacitor body to be spaced apart from each other, and each including a carbon material; and first and second conductive resin layers respectively disposed on the first and second reinforcing layers such that an interface is defined therebetween.

20. The multilayer capacitor of claim 19, wherein the first and second reinforcing layers directly contact different respective portions of the external surfaces of the capacitor body.

21. The multilayer capacitor of claim 19, wherein the first and second reinforcing layers are respectively disposed on the first and second external electrodes to overlay the different respective portions of the external surfaces of the capacitor body.

22. The multilayer capacitor of claim 19, wherein the first and second internal electrodes are exposed on respective opposing external surfaces of the capacitor body, and the first and second reinforcing layers are disposed on the respective opposing external surfaces of the capacitor body.

23. The multilayer capacitor of claim 19, wherein the first and second internal electrodes are exposed on respective opposing external surfaces of the capacitor body, and the first and second reinforcing layers are disposed only on external surfaces of the capacitor body other than the respective opposing external surfaces of the capacitor body.

24. The multilayer capacitor of claim 19, wherein each of the first and second reinforcing layers further includes an impact-absorbing binder.

25. A multilayer capacitor comprising:
a capacitor body including first and second surfaces opposing each other, third and fourth surfaces connected to the first and second surfaces and opposing each other in a length direction, and fifth and sixth surfaces connected to the first and second surfaces, connected to the third and fourth surfaces, and opposing each other, and including alternately stacked first internal electrodes and second internal electrodes having dielectric layers interposed therebetween and each having one end thereof exposed through a respective one of the third and fourth surfaces;

first and second conductive layers respectively including first and second connection portions respectively disposed on the third and fourth surfaces of the capacitor body and respectively connected to the first and second internal electrodes, and first and second band portions respectively extending from the first and second connection portions to respective portions of the first, second, fifth, and sixth surfaces of the capacitor body;

first and second reinforcing layers each including a carbon material and respectively disposed on the first and second band portions; and first and second layers respectively disposed on the first and second reinforcing layers such that an interface is defined therebetween, wherein the first and second reinforcing layers are not disposed on the third and fourth surfaces of the capacitor body.

26. A multilayer capacitor comprising:
a capacitor body including first and second surfaces opposing each other, third and fourth surfaces connected to the first and second surfaces and opposing each other in a length direction, and fifth and sixth surfaces connected to the first and second surfaces, connected to the third and fourth surfaces, and opposing each other, and including alternately stacked first internal electrodes and second internal electrodes having dielectric layers interposed therebetween and each having one end thereof exposed through a respective one of the third and fourth surfaces;

first and second conductive layers respectively including first and second connection portions respectively disposed on the third and fourth surfaces of the capacitor body and respectively connected to the first and second internal electrodes, and first and second band portions respectively extending from the first and second connection portions to respective portions of the first, second, fifth, and sixth surfaces of the capacitor body;

first and second reinforcing layers each including a carbon material and respectively disposed on the first and second band portions; and first and second conductive resin layers respectively disposed on the first and second reinforcing layers such that an interface is defined therebetween.

27. The multilayer capacitor of claim 26, wherein a length of the first and second reinforcing layers in the length direction is longer than a length of the first and second band portions in the length direction.

28. The multilayer capacitor of claim 26, wherein the first and second reinforcing layers are further respectively disposed on the first and second connection portions.

29. The multilayer capacitor of claim 26, wherein the first and second conductive resin layers are disposed on the first and second conductive layers, respectively, wherein the first reinforcing layer is disposed between the first conductive layer and the first conductive resin layer, and the second reinforcing layer is disposed between the second conductive layer and the second conductive resin layer.

30. The multilayer capacitor of claim 29, wherein a length of the first and second reinforcing layers in the length direction is longer than a length of the first and second band portions in the length direction.

31. The multilayer capacitor of claim 29, wherein the first and second reinforcing layers are further respectively disposed on the first and second connection portions.

32. The multilayer capacitor of claim 26, further comprising first and second plating layers disposed on the first and second conductive layers, respectively, wherein the first reinforcing layer is disposed between the first conductive layer and the first plating layer, and the second reinforcing layer is disposed between the second conductive layer and the second plating layer.

33. The multilayer capacitor of claim 32, wherein the first and second plating layers comprise first and second nickel (Ni) plating layers disposed on the first and second conductive layers, respectively, and first and second tin (Sn) plating layers disposed on the first and second nickel plating layers, respectively.

34. The multilayer capacitor of claim 26, wherein the carbon material of the first and second reinforcing layers comprises one or more of graphene, carbon nanotubes, or carbon black.

35. The multilayer capacitor of claim 26, wherein the first and second reinforcing layers each includes an impact-absorbing binder comprising an epoxy-based or an acrylic-based binder.

* * * * *